United States Patent [19]
Waite et al.

[11] Patent Number: 5,102,547
[45] Date of Patent: Apr. 7, 1992

[54] ANTI-FOULING SEMI-PERMEABLE MEMBRANE SYSTEM

[75] Inventors: Warren A. Waite, Burlington; Hans I. Viklund, Marlboro, both of Mass.

[73] Assignee: Ionics, Incorporated, Watertown, Mass.

[21] Appl. No.: 718,580

[22] Filed: Jun. 21, 1991

[51] Int. Cl.⁵ .............................................. F01D 65/02
[52] U.S. Cl. .................................... 210/501; 264/45.1
[58] Field of Search ...................... 210/636, 639, 500.2, 210/501, 654; 264/41–45.1

[56] References Cited

U.S. PATENT DOCUMENTS 4,964,998  10/1990  Cadotte et al. ........................ 210/654

Primary Examiner—Frank Sever
Attorney, Agent, or Firm—Jerry Cohen; Edwin H. Paul

[57] ABSTRACT

Semi-permeable membrane and membrane/support assemblies and systems for microfiltration, ultrafiltration, nanofiltration, reverse osmosis, electrodialysis, electrodeionization and piezodialysis filter systems are formed of polymer membranes (14), including fine particle moieties (24) or threads (16) of substantially water insoluble, oligodynamic bioactive (biostatic and/or biocidal) dispersed material. When these membranes systems are used in aqueous liquids the dispersed material dissolves slowly and provides a continuous biostatic and/or biocidal action over a long duration to counteract membrane fouling propensities of the system environment.

12 Claims, 2 Drawing Sheets

ANTI-FOULING SEMI-PERMEABLE MEMBRANE SYSTEM

FIELD OF THE INVENTION

The present invention relates to semi-permeable membranes and systems comprising such membranes where these membranes utilize oligodynamic biostatic and/or biocidal materials dispersed in the membranes. These oligodynamic biostatic and biocidal materials inhibit microbial fouling of the membranes under long term use or storage. More specifically this invention relates to microfiltration (MF), ultrafiltration (UF), nanofiltration (NF), reverse osmosis (RO also called hyperfiltration (HF)), electrodialysis (ED), electrodeionization (EDI) and piezodialysis (PD) systems and the like, the semipermeable membranes used in such systems and the methods of manufacturing such membranes.

BACKGROUND OF THE INVENTION

A recurring problem with all types of semi-permeable membrane systems used in the treatment of aqueous liquids is that microorganisms may cling to the fluid/membrane interface and multiply. If there is no control for these microorganisms they may grow quickly, fouling and clogging the membrane, especially when the liquid is not flowing.

Several workers in the field have recognized this problem. Beauman et al., in their 1983 U.S. Pat. No. 4,396,512 (assignee Everpure), provide a minor portion of silver bearing inert fibrous material, preferably cellulose, combined with a major portion of activated carbon to inhibit microorganism growth. The cellulose has individual fibers with sizes of about 10–1,000 micrometers with diameters of about 2–25 micrometers. The density is 0.3 grams per cc by dry tapped volume and the cellulose is impregnated with silver providing 1–5% of dry weight. In Beauman et al, the silver is adsorbed to the inert material and the resulting mixture is used as a packing material in a filter.

The 1976 U.S. Pat. No. 3,734,897 to Stoy et al., (Czechoslovak Academy) discloses the use of biostatic silver or copper with copolymers where the metal ions form a chelate complex bond with the polymeric composition. The polymeric material is used to form membranes. Here "biostatic" is defined as an action which inhibits microorganism growth. Stoy, et al, teach a complex, expensive method of manufacturing the silver or copper bearing membrane. The resulting membrane, since the biostatic metal is chemically bound, will not release all the metal and some of the metal cannot be used to inhibit microorganism growth. Thus more metal than necessary must be used.

Bettinger, in his 1979 U.S. Pat. No. 4,278,548 (assignee Dupont), adds iodide, hydrogen peroxide or derivatives directly to a liquid flow upstream of polyamide reverse osmosis membranes. These additions control the bacterial growth on the filter material and are useful for several months. Bettinger requires a separate injection capability which adds complexity and cost to the system.

An object of the present invention is the provision of a biostatic additive directly to and as part of semi-permeable membrane systems, for example, MF, UF, NF, RO, ED, EDI, PD and the like, which additive effectively inhibits the growth of microorganisms over a longer period compared to prior art systems. Such additives are easy to incorporate, economical to use and do not substantially interfere with the normal function of the membranes.

It is a further object of the present invention to provide a biostatic agent for semi-permeable membrane systems and the like which agent is effective in both flowing and non-flowing aqueous conditions (the latter conditions found when such membranes and assemblies of membranes are stored wet).

It is a further object of the present invention to use an economic quantity and form a a biostatic agent compared to prior art systems.

SUMMARY OF THE INVENTION

The foregoing objects are met in a semi-permeable membrane system such as a MF, UF, NF, RO, ED, EDI, PD and the like comprising one or more polymer membranes with elemental, alloy, and/or substantially water insoluble oxide, hydroxide, salt and/or soap forms of antimony, bismuth, copper, mercury, silver, tin and zinc as a dispersed phase within, or a coating on, the membrane or pores therein and within an associated integral carrier substrate of such membrane, as a long term source of biostatic and/or biocidal agents. Such bioactive metals, their alloys and water insoluble derivatives and compounds thereof are referred to herein and defined as "oligodynamic materials". The moieties in the disperse phase preferably have a characteristic dimension of from about 1 to about 500 microns, more preferably from about 2 to about 50 microns. Herein, characteristic dimension means about six (6) times the ratio of the apparent volume to the apparent area of the moiety, viz. not including pores or surface microroughness. Such moieties are dispersed and/or physically trapped within at least a portion of the membrane itself, and/or physically adhered to the external and/or internal surfaces of the membrane. In either case there is no covalent or ionic bonding to the membrane substance itself. For purposes of this disclosure "membrane" and "membrane substance" are defined to include the semi-permeable active regions of the membrane and any associated porous, woven or nonwoven supports. The substantially water insoluble oligodynamic materials have low but significant aqueous solubility (generally less than 10 milligrams per liter, which herein is defined as "substantially insoluble"). The materials thus dissolve slowly in any aqueous liquid. The ions formed as the materials dissolve act as biostatic and /or biocidal agents and effectively inhibit micro-organisms from multiplying, even in still water. This results since the micro-organisms grow at the membrane/liquid interface, and the metal ions will be forming at this interface. This is especially helpful since membranes made as in this invention will have long wet storage life without substantial micro-organism growth.

Concentrations of oligodynamic materials for biostatic/biocidal purposes range from about 0.005 to 15%, but preferably from about 0.05 to 5% (by dry weight) of membrane weight. The oligodynamic materials can be added to a porous woven or non-woven support component of a membrane system, or to the membrane substance per se. A membrane using various polymeric compounds, with the finely dispersed oligodynamic material in accord with the invention, may be cast or otherwise formed as a membrane useful in MF, UF, NF, RO, ED, EDI, PD systems and the like. Such a membrane may be anisotropic or isotropic in its porosity.

The membrane may be a monolithic film or used in a film composite or other laminate form. Such membranes are often categorized as "permselective", which is defined as having high flux rates for more permeable components and high rejection rates for less permeable components in a solution and/or suspension. Anisotropic is defined as having a concentration and/or size/shape gradation of pores from one side of the membrane to the other side and/or in its length dimension. "Isotropic" means substantial uniformity throughout. The membrane may be in the form of sheets, tubes (including flattened tubes) or hollow fibers.

The oligodynamic material may, for example, be formed into fine moieties and stirred or mixed with a solution of soluble polymers, preferably polysulfones (PSU) or polyethersulfones (PES), in an appropriate amount. The suspension or emulsion thus formed has concentrations of about 0.005 to 15%, preferably about 0.5%, dry weight, of oligodynamic material. The moieties remain substantially dispersed and when the film is cast on a support the moieties are physically trapped within the membrane substance and/or adhere to the external and/or internal surfaces of the membrane.

The oligodynamic material may be electrolessly plated or otherwise deposited into an effective position onto either a porous woven or non-woven fabric part of a membrane and/or directly on the membrane substance itself. The plating or the particles dissolve slowly in aqueous solutions forming a biostatic and/or biocidal agent.

Other objects, features and advantages will be apparent from the following detailed description of preferred embodiments thereof taken in conjunction with the accompanying drawings in which:

DETAILED DESCRIPTION OF THE PREFERRED EMBODIMENTS

Figure 1:
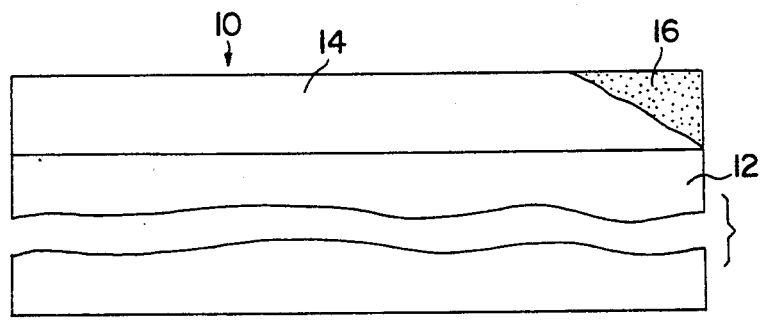
FIG. 1 is a cross section of a semi-permeable membrane according to a preferred embodiment of this invention, utilizing oligodynamic material dispersed within a membrane cast onto a porous support.

As shown in FIG. 1, a preferred embodiment of an antifouling semi-permeable membrane 10 comprises a laminate of two layers 12 and 14. One layer 12 is a woven or non-woven fibrous or other porous support. The second layer 14 is a polymeric membrane layer with oligodynamic material moieties 16 dispersed throughout.

The moieties are less than about 50 microns in characteristic dimension. The embodiment shown in FIG. 1 represents, for example, a permselective UF membrane.

Figure 2:
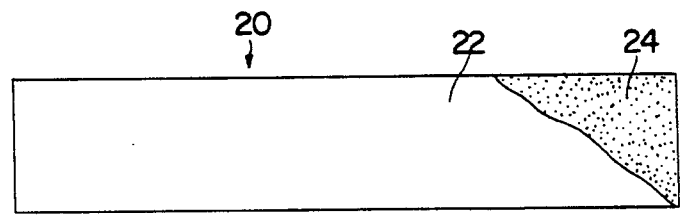
FIG. 2 is a cross section of a further preferred embodiment of the invention comprising a free membrane with oligodynamic material dispersed throughout.

FIG. 2 shows a semi-permeable membrane in a single thin layer of polymeric material 22 with oligodynamic moieties 24 dispersed throughout—a second preferred embodiment or practice of the invention. This embodiment may also comprise, for example, a UF membrane. The polymeric membrane, methods of manufacturing the same, and their use in UF systems are known in the art. See, for example, U.S. Pat. Nos. 4,913,816 and 4,822,471 both assigned to Ionics, Incorporated. Both of these patents are herein incorporated by reference as if they were laid out in full.

In the FIGS. 1 and 2 embodiments a polymer solution containing dispersed oligodynamic material is formed into a membrane containing about 0.5% by dry weight of oligodynamic moieties. When manufacturing the membranes the oligodynamic moieties are stirred, or otherwise dispersed, so as to distribute the moieties substantially uniformly throughout the solution. The moieties 16 and 24 contribute biostatic and biocidal cations to aqueous solutions with which they are in contact. These ions are the agents which inhibit the growth of microorganisms.

Figure 3:
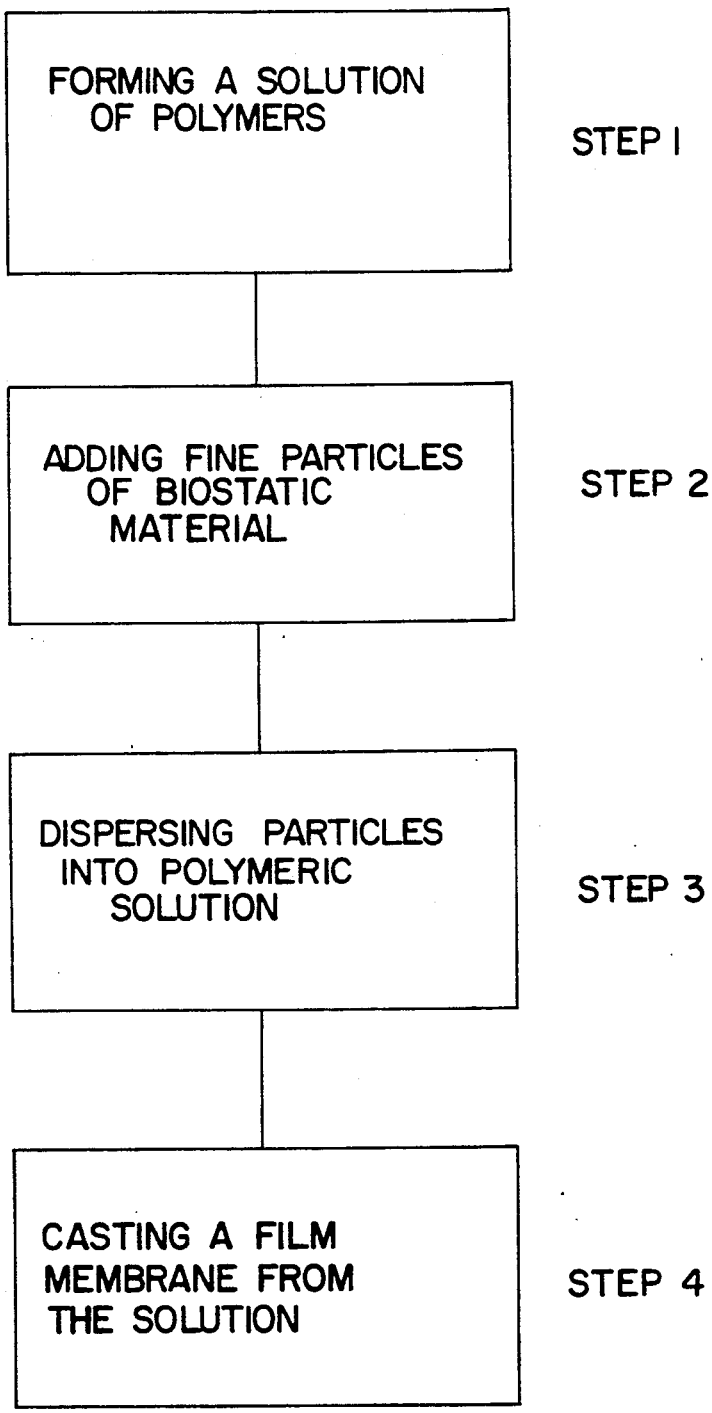
FIG. 3 is a flow chart of a method of forming a semi-permeable membrane with dispersed oligodynamic matter as in the FIG. 1 and FIG. 2 embodiments.

FIG. 3 is a flow chart of the process used to form the membranes shown in FIGS. 1 and 2. In step 1 polymers (including film forming and/or precursor components) are dissolved in an organic solvent, e.g. dimethylsulfoxide (DMSO), DMSO-acetone mixtures, N-methyl pyrrolidone, 2-pyrrolidone, tetrahydrothiophene, etc. Others are found in the literature. See, for example, U.S. Pat. No. 3,691,068 to Cross, assigned to Amicon.

In step 2, finely divided oligodynamic material is added and in step 3 dispersed throughout the polymer solution. Steps 1, 2 and 3 may be combined.

In step 4 the resulting solution is cast into a thin film membrane by known methods resulting in a membrane with the dispersed oligodynamic material in at least one region of the the membrane. This membrane may be designed to form a semipermeable membrane, per se, or the membrane may be designed to form a porous support base for a composite membrane. In either case the resulting membrane, when immersed in an aqueous solution will slowly release oligodynamic ions into such solutions.

Since the oligodynamic material according to this invention has low solubility in water, the formation of ions will be slow but continuous, thus providing long term protection. However, with the concentrations of oligodynamic material used, the concentration of ions produced at the membrane/solution interface will be an effective biostat and/or biocide.

Figure 4:
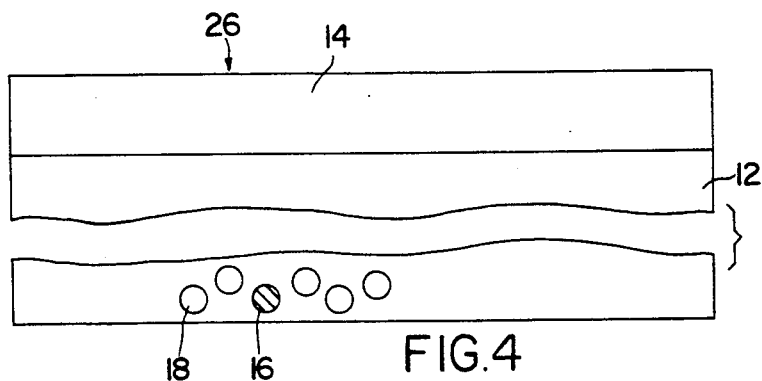
FIG. 4 is a cross section of a further preferred embodiment of the invention comprising a semi-permeable membrane utilizing oligodynamic metal or metal coated threads woven into a fabric support.

FIG. 4 shows yet another preferred embodiment. A filtration system 26 utilizes threads 16, coated in whole or in part with oligodynamic material, woven among other non-oligodynamic threads 18 into the support fabric 12 onto which the polymer solution is cast. The oligodynamic threads 16 may comprise in whole or in part oligodynamic material, e.g. copper threads or threads coated with such materials. These oligodynamic threads may have any cross section known in the art. The membrane 14 may be formed by precipitation from the solution by immersion in a non-solvent or in other ways known in the art.

Figure 5:
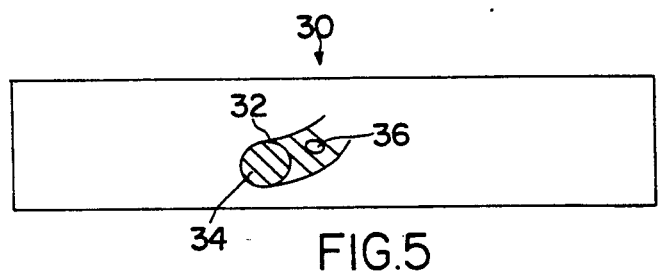
FIG. 5 is a cross section of another preferred embodiment of the invention comprising a semi-permeable membrane in which strands in the membrane are partially plated or coated with oligodynamic material.

FIG. 5 shows another preferred embodiment where the membrane 30 comprises polymer threads 34, shown in cross section with a partial plating 32 on the surface and in the pores 36 of the polymer threads.

The casting of the polymer membrane having the dispersed oligodynamic material on a woven or nonwoven support material may be typically accomplished by various methods of "precipitating" out the polymer containing the oligodynamic material dispersed throughout. Here "precipitation" is meant to indicate that a solid is formed; the process may also be termed coagulation.

One such common method of forming the porous support film is called "phase inversion". This method involves spreading a thin coating of the polymer solution (with the dispersed oligodynamic material) onto a woven or non-woven support and then immersing the resulting structure in a non-solvent for the polymer. The non-solvent acts to solidify or coagulate the polymer (with the dispersed oligodynamic material) in and-/or on the woven or non-woven support. The coagulated polymer may form an isotropic or anisotropic membrane. A porous semi-permeable membrane may be used as a support for a less porous semipermeable membrane, e.g. an MF membrane as a support for a UF membrane, or a UF membrane as a support for a RO membrane.

Interfacial condensation polymerization is a common process useful for making membranes. Here an extremely thin film membrane is formed by polymerization at the interface of an aqueous phase layer and an immiscible non-aqueous layer or organic layer. Other casting processes known in the industry may be used as appropriate alternatives, including non-interfacial polymerization or casting of monomers.

Preferred embodiments may use elemental silver, copper, and/or alloys thereof. The substantially water insoluble salts, oxides and soaps of silver and copper may also be used.

According to another preferred embodiment, one can replace the fine metal particles with electroless plating of the copper and/or silver (or other appropriate metal) onto the solid support or directly onto the porous or non-porous polymer membrane.

In another preferred embodiment one can utilize a colloidal form of copper or silver to replace or supplement the fine metal particles. Here the colloidal form of the copper or silver is dispersed in the polymer solutions before being coagulated into a porous or non-porous polymeric film for use as a semipermeable membrane.

The following non-limiting examples illustrate the practice of the invention.

EXAMPLE 1

A polysulfone (PSU) solution, containing 0.005% copper metal particles of about 2-4 microns in size was cast onto a woven support fabric and converted by a known normal phase inversion process into a porous polymer film with the copper particles uniformly distributed throughout. This film was stored in water and exhibited only slight microorganism growth after 18 months. A similar film with no copper content exhibited substantial microorganism growth after 6 months.

EXAMPLE 2

A PSU solution, containing 0.5% copper metal particles was cast onto a woven support fabric by a known normal phase inversion process forming a porous polymer film with the copper particles uniformly distributed throughout. This film was stored in water and exhibited no microorganism growth after 18 months.

EXAMPLE 3

A PSU solution, containing 0.5% silver particles was cast onto a woven support fabric by a known normal phase inversion process forming a porous polymer film with the silver particles uniformly distributed throughout. This film was stored in water and exhibited only slight microorganism growth after 12 months.

EXAMPLE 4

A solution was prepared by mixing about 75 parts of N,N-bis-(2-hydroxy ethyl) tallow amine and about 25 parts of polypropylene at a temperature in excess of about 168 degrees C under nitrogen. The solution was filtered hot and about 0.25 parts of $-325$ mesh 90:10 copper-tin alloy powder was added. The resulting dispersion was cast onto a water cooled roll having a temperature of about 75 degrees C. The resulting sheet was extracted with methanol to form an MF membrane, which was found to have a thickness of about 7 mils. The membrane was stored in water and exhibited only slight microorganism growth after 18 months.

Similar results are obtained when the copper-tin alloy is replaced in the preparation by an equal amount of $-325$ mesh 70:30(w/o) copper-zinc alloy powder, $-325$ mesh 95:5 tin-silver alloy powder, $-325$ mesh zinc powder, or $-325$ mesh antimony powder.

EXAMPLE 5

A solution was prepared from 15 parts polysulfone, 80 parts dimethyl formamide and about 5 parts copper naphthenate soap in naphtha. The solution was coated on a polyester support fabric which was immediately immersed in water. The resulting microporous membrane was thoroughly rinsed with water and then stored in water. After 18 months only slight microorganism growth was exhibited.

EXAMPLE 6

A woven polyester fabric was washed, dried and then etched in a chromic acid-sulfuric acid mixture at about 60 degrees C, neutralized to remove the chromic acid, activated with stannous chloride and palladium chloride in hydrochloric acid, rinsed in a dilute caustic solution and thinly plated with copper from a solution of 15 grams/liter cupric nitrate trihydrate, 10 grams/liter sodium bicarbonate, 30 grams/liter Rochelle Salt and 100 milliliters/liter of 37% formaldehyde. The treated fabric was rinsed with water and then coated with a solution of 15 parts polysulfone and 85 parts dimethyl formamide. The coated fabric was immediately immersed in water. The resulting microporous membrane is rinsed thoroughly in water and then stored in water. The membrane exhibited only slight microorganism growth after 18 months.

EXAMPLE 7

A first solution was prepared by dissolving 5 grams of silver nitrate in 300 ml of demineralized water, adding aqueous ammonia until the precipitate is nearly entirely redissolved, filtering and diluting to 500 ml. A second solution was prepared by dissolving one gram of silver nitrate in about 500 ml of boiling demineralized water, dissolving 0.83 grams of Rochelle salt in a small amount of water and adding to the boiling solution. The boiling is continued for 30 minutes and the solution was filtered hot, diluted to 500 ml and allowed to cool. An AR103 PZL anion exchange membrane (from Ionics Inc., Watertown, Mass.) was rinsed thoroughly in water. Equal parts of the first and the second solutions are mixed together at room temperature and poured over the membrane in a tray. The membrane was thoroughly rinsed in water and stored in water. After 18 months only slight microorganism growth was exhibited.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the Doctrine of Equivalents.

What is claimed is:

1. A membrane system comprising:
   a semi-permeable membrane comprising as a dispersed component of at least a portion of its interior and/or surface at least one substantially water insoluble oligodynamic material selected from the group consisting of antimony, bismuth, copper, mercury, silver, tin, zinc, alloys thereof, and the substantially water insoluble oxides, hydroxides, inorganic salts, organic salts and soaps thereof,
   wherein said dispersed substantially water insoluble oligodynamic bioactive material is linked with said membrane, substantially without chemical bonding to said membrane.

2. A membrane system comprising a semi-permeable membrane carried on a support, at least one portion of the membrane or the support or both comprising as a dispersed component of at least a portion of their interior and/or surface at least one substantially water insoluble oligodynamic material selected from the group consisting of antimony, bismuth, copper, mercury, silver, tin, zinc, alloys thereof, and the substantially water insoluble oxides, hydroxides, inorganic salts, organic salts and soaps thereof,
   wherein said dispersed substantially water insoluble oligodynamic bioactive material is linked with said membrane or support or both, substantially without chemical bonding to said membrane or support.

3. A membrane as recited in claim 2 wherein said support is a fabric comprised of filaments containing said water insoluble oligodynamic bioactive material.

4. A membrane as recited in either of claim 1 or 2 where said water insoluble oligodynamic bioactive material is in the form of moieties having characteristic dimensions between about 1 and 4 about 500 microns.

5. A membrane as recited in either claims of 1 or 2 wherein the concentration of said water insoluble oligodynamic bioactive material in said membrane is in the range from about 0.05% to about 15% by weight on a dry basis.

6. A membrane as recited in either of claims 1 or 2 wherein said substantially water insoluble material dissolves slowly into water producing biostatic and/or biocidal activity over a long duration.

7. A membrane as recited in claim 6 wherein said water insoluble oligodynamic bioactive material comprises at least a portion thereof selected from the group consisting of silver and silver alloys.

8. A membrane as recited in claim 6 wherein said water insoluble oligodynamic bioactive material comprises at least a portion thereof selected from the group consisting of copper and copper alloys.

9. A membrane as recited in claim 6 wherein said biostatic and/or biocidal activity persists for more than six months.

10. A membrane as recited in claim 6 wherein said biostatic and/or biocidal activity persists for more than twelve months.

11. A membrane as recited in claim 6 wherein said biostatic and/or biocidal activity persists for more than eighteen months.

12. A process for producing a fouling resistant semipermeable membrane comprising the steps of:
    a) forming a dispersion which comprises at least one semipermeable membrane precursor component and a substantially water insoluble oligodynamic biostatic and/or biocidal material selected from the group consisting of antimony, bismuth, copper, mercury, silver, tin, zinc, alloys of said metals, and substantially water insoluble oxides, hydroxides, inorganic salts, organic salts and soaps of said metals,
    b) forming said dispersion into a structural form selected from the group consisting of hollow fiber, tubular, block, rod and sheet forms, and
    c) solidifying said formed dispersion,

* * * * *